Oct. 10, 1967    A. M. BARON    3,346,274

INSULATED UNION COUPLING

Filed June 1, 1966

INVENTOR
ALFRED M. BARON

BY Cullen, Sloman, & Cantor

ATTORNEYS

United States Patent Office 3,346,274
Patented Oct. 10, 1967

3,346,274
INSULATED UNION COUPLING
Alfred M. Baron, Los Angeles, Calif., assignor to Brass Craft Manufacturing Company, Wayne County, Mich.
Filed June 1, 1966, Ser. No. 554,515
1 Claim. (Cl. 285—52)

This invention relates to appliance connectors and more particularly to dielectric unions for joining together two sections of tubing or pipe.

To eliminate the inconvenience and time required for pipe cutting and threading multiple elements such as is generally required in the connection of water-using appliances to fixed plumbing outlets, it has become the practice to utilize a pre-assembled unit comprising a flexible hose or tubing with threaded unions at each end. When the flexible tubing is fabricated from a metal, such as copper, the possibility of galvanic corrosion arises between the flexible tubing and the fittings or pipes of dissimilar metals to which it is connected.

Accordingly, it is an object of this invention to provide a dielectric union for use in joining together pipes or tubing of dissimilar metals whereby galvanic corrosion may be prevented.

It is a further object of this invention to provide a pre-assembled leakproof dielectric union which is capable of preventing galvanic corrosion.

These and other objects of this invention will become apparent from the following description when considered in conjunction with the accompanying drawings.

Figure 1:
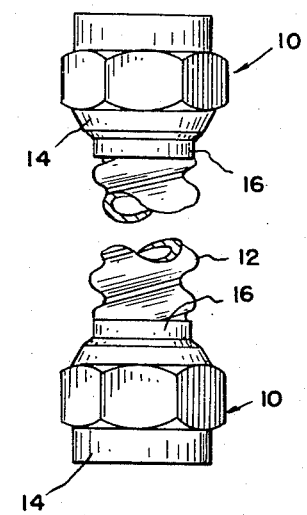
FIG. 1 is a partially fragmented elevation of a flexible connector utilizing the improved union of this invention.

Referring now to FIG. 1 of the drawings, there is illustrated a flexible connector such as might employ the novel union of this invention. This flexible connector comprises a pair of union assemblies 10 secured to the respective ends of a flexible corrugated copper tube 12. As can be seen more clearly in FIGS. 2 and 3, each of the union assemblies 10 generally comprises a brass nut 14, a dielectric sleeve 16, a dielectric bushing 18, and a dielectric washer 20.

Nut 14 is provided with a plurality of lands 22 so that the exterior of the nut has the conventional hexagonal shape. Nut 14 has an axial bore passing therethrough which is provided at its right-hand end (as viewed in FIG. 3) with internal threads 24. The left-hand portion of the internal bore is provided with a shoulder 26 which the flared end 28 of sleeve 16 abuts when assembled. Similarly, tubing 12 has a flared end portion 30 which engages the inner face of the flared end 28 of sleeve 16. Sleeve 16 may be fabricated of a dielectric material such as heat stabilized nylon.

Figure 2:
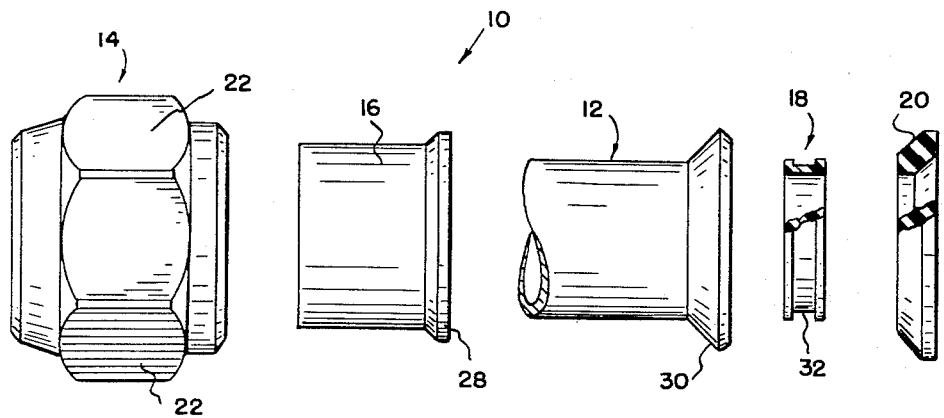
FIG. 2 is an exploded elevational view of the union of this invention, with some of the elements being partially fragmented.
Figure 3:
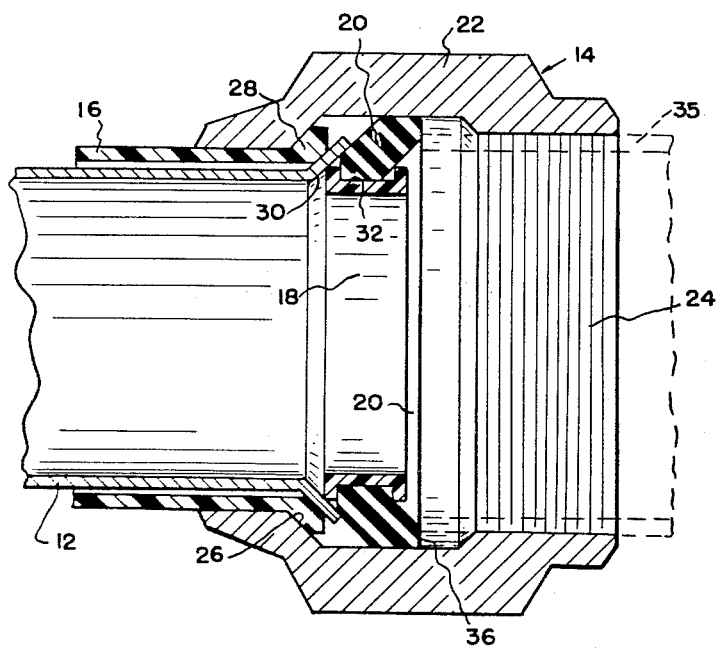
FIG. 3 is a cross-sectional elevation of an assembled union made in accordance with this invention.

Heat stabilized nylon may also be used for dielectric bushing 18. As illustrated in FIGS. 2 and 3, bushing 18 is provided with a groove 32 passing around its outer circumference. Thus, bushing 18 acts as a retainer for dielectric washer 20, as will be described below. Washer 20 is preferably made from a synthetic rubber material such as neoprene with silicone.

To assemble the dielectric union of this invention, sleeve 16 is first inserted into nut 14 from the right towards the left as viewed in FIGS. 2 and 3. Tubing 12, the ends portions of which are uncorrugated and initially unflared, is then inserted into the bore of nut 14 from the left. Once sleeve 16 and tubing 12 are in place within nut 14, the end of tubing 12 can be flared at 30 by a die or the like. The relative diameters of sleeve 16 and tubing 12 are such that a small annular gap exists between these two elements, so that union 14 may be freely rotated relative to tubing 12 when a nipple or the like is threaded into the union.

Bushing 18 and washer 20 are then pre-assembled and pressed through the threaded end of nut 14. Washer 20 is sufficiently resilient that it deflects to pass over the threads 24. The washer is so configured that it wedges against the interior bore of the nut, due to the compression between the bore of the nut and bushing 18. Once in place, bushing 18 and washer 20 cannot be removed, since pressure toward the right only increases the wedging action. In this manner, tubing 12 is clamped in place between the flared end 28 of sleeve 16 and washer 20, and a fluid tight seal is created.

A nipple or other fitting 34 (shown in dotted lines) may then be threaded into the right hand end of the fitting engaging the annular face 36 of washer 20. The configuration of the washer permits a leakproof seal to be established even if a badly cut or faced nipple is used.

It can be seen that nut 14 is electrically insulated from tubing 12 by dielectric sleeve 16. Similarly, bushing 18 and washer 20 function to prevent contact between tubing 12 and fitting 34 secured to the threaded portion 24 of nut 14. If desired, nut 14 can be provided with a galvanized finish.

Thus, this invention provides a dielectric union which eliminates the problem of galvanic corrosion between dissimilar metals by completely insulating such metals from contact with each other.

In addition, whereas prior devices, of this character, all required a separate adapter member for connecting the union to the nipple 34, the construction herein completely eliminates the need for adaptors of any sort, permitting direct connections and thereby reducing the number of parts and the overall expense of this construction.

This invention may be further developed within the scope of the following claim. Accordingly, the above description is to be interpreted as illustrative of only a single operative embodiment and not in a strictly limited sense.

I now claim:

In a pre-assembled flexible connector characterized by a length of flexible metallic tubing having a union at each of its respective ends, each of the unions comprising:

a hexagonal nut having a hollow bore passing therethrough, the first end of said bore being provided with internal threads adapted to receive the externally threaded end of an element to be joined to the connector, the portion of said bore intermediate said internally threaded portion and the second end of said bore having an internal diameter greater than that of said threaded portion or that of said second end of said bore, whereby an internal shoulder is formed between said intermediate portion and said second end of said bore;

a dielectric sleeve having a flared end, said sleeve protruding from said second end of said bore, and said flared end abutting said bore shoulder to prevent the withdrawal of said sleeve from said nut through said second end of said bore, said sleeve so positioned within said nut as to prevent metal to metal contact between said nut and said flexible metallic tubing entering said nut from said second end of said bore;

the end of said flexible metallic tubing entering said second end of said bore being flared outwardly after insertion into said nut, said flared end of said flexible metallic tubing abutting the inner periphery of said flared end of said dielectric sleeve;

an annular dielectric bushing having an external groove extending around its outer circumference;

an annular dielectric washer having an internal diameter adapted to seat within said bushing groove and an outside diameter greater than the internal diameter of said nut internal threads, said dielectric washer being sufficiently flexible to permit the insertion of said bushing and washer assembly through said first end of said bore and into said intermediate portion of said bore;

said flared end of said flexible metallic tubing being retained within said nut between said flared end of said dielectric sleeve and said dielectric washer, and said dielectric washer being compressably retained between said intermediate portion of said bore and said bushing, whereby metal to metal contact between the ends of said flexible metallic tubing and the element joined to said threaded end of said nut is prevented by said bushing and washer assembly.

References Cited

UNITED STATES PATENTS

| | | | |
|---|---|---|---|
| 502,038 | 7/1893 | Herman | 285—51 |
| 2,278,479 | 4/1942 | Parker | 285—54 |
| 2,669,465 | 2/1954 | Newell | 285—52 X |
| 2,790,661 | 4/1957 | Tamminga | 285—334.3 X |
| 2,867,463 | 1/1959 | Snider | 285—52 X |
| 3,076,667 | 2/1963 | Klingler | 285—379 X |

FOREIGN PATENTS

| | | |
|---|---|---|
| 529,228 | 8/1956 | Canada. |

CARL W. TOMLIN, *Primary Examiner.*

RICHARD G. BERKLEY, *Assistant Examiner.*